US009000406B2

(12) United States Patent
Hu et al.

(10) Patent No.: US 9,000,406 B2
(45) Date of Patent: Apr. 7, 2015

(54) METHOD AND APPARATUS OF DRIVE CURRENTS CONTROL OVER A SOLID STATE LIGHT SOURCE

(71) Applicant: Appotronics Corporation Limited, Shenzhen (CN)

(72) Inventors: Fei Hu, Shenzhen (CN); Yi Li, Pleasanton, CA (US); Yi Yang, Shenzhen (CN); Liangliang Cao, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 267 days.

(21) Appl. No.: 13/629,591

(22) Filed: Sep. 27, 2012

(65) Prior Publication Data

US 2013/0075633 A1 Mar. 28, 2013

Related U.S. Application Data

(60) Provisional application No. 61/539,962, filed on Sep. 27, 2011.

(51) Int. Cl.
*H05B 33/08* (2006.01)
*G03B 21/14* (2006.01)

(52) U.S. Cl.
CPC .......... *H05B 33/0833* (2013.01); *H05B 33/086* (2013.01)

(58) Field of Classification Search
USPC ............ 250/205, 216, 226, 552; 362/84, 227, 362/231; 353/84, 85, 94, 121
See application file for complete search history.

(56) References Cited

U.S. PATENT DOCUMENTS

| | | | | |
|---|---|---|---|---|
| 7,083,284 | B2 | 8/2006 | Peterson et al. | |
| 7,614,750 | B2 * | 11/2009 | May et al. | 353/29 |
| 8,616,705 | B2 * | 12/2013 | Li et al. | 353/31 |
| 2006/0087847 | A1 | 4/2006 | Yamanaka | |

FOREIGN PATENT DOCUMENTS

CN 2893733 Y 4/2007

OTHER PUBLICATIONS

Chinese Office Action, dated Feb. 11, 2014, in related Chinese patent application, No. CN 201110385139.9.
IPRP in related PCT application No. PCT/CN2012/078091, dated Jun. 3, 2014.
ISR in related PCT application No. PCT/CN2012/078091, dated Oct. 4, 2012.

* cited by examiner

*Primary Examiner* — Kevin Pyo
(74) *Attorney, Agent, or Firm* — Chen Yoshimura LLP

(57) ABSTRACT

A solid state light source module includes two solid state light sources, a light combining device for combining the lights from the two sources, a color wheel receiving the combined light and alternatingly outputting at least two primary color lights, a sync signal generator coupled to the color wheel for generating a periodic sync signal, and a controller for supplying a drive signal to each solid state light sources based on the sync signal. During at least one sub-period of the period, one of the two solid state light sources is turned on by its drive signal and the other one is kept in an inactive state by its drive signal.

17 Claims, 5 Drawing Sheets

METHOD AND APPARATUS OF DRIVE CURRENTS CONTROL OVER A SOLID STATE LIGHT SOURCE

This application claims priority under 35 USC §119(e) from U.S. Provisional Patent Application No. 61/539,962, filed Sep. 27, 2011, which is herein incorporated by reference in its entirety.

BACKGROUND OF THE INVENTION

1. Field of the Invention

The present invention relates to a drive power control method and apparatus for a solid state light source. More particularly, the present invention relates to a drive power control method and apparatus in a light source application that requires high luminance sequential color light, such as a single-digital light processor (DLP) projection display.

2. Description of the Related Art

In conventional applications that require high luminance light sources, such as projection display systems or stage lighting, gas discharge lamps such as ultra high performance (UHP) lamps are usually used. However, gas discharge lamps suffer from short lifetimes and cause environment pollution.

In more detail, FIG. 1 is a schematic view of a conventional single-DLP projection system. A UHP lamp 201 generates a white light which is collected by a reflector 202 and condensed by a lens 203. A color wheel 204 allows primary colors such as red (R), green (G) and blue (B) light to pass through sequentially (see FIG. 3 and more detailed descriptions below). The different color light sequentially arrives at a spatial light modulator 210 through a series of optics such as integration rod 205, lenses 206, 207 and 208, and TIR prism 209. The modulated color light is directed to a projection lens 211 and forms an image on a screen.

A more environmentally-friendly choice of light source for this type of application is solid state light (SSL) sources based on laser diodes (LDs) or light emitting diodes (LEDs). One solution of replacing UHP lamps by a SSL source is shown in FIG. 2. A UV or blue SSL source 111 generates a UV or blue light which excites a wavelength conversion material such as a phosphor carried on a wheel 112 to generate a wide spectrum light that has more than one primary color light needed for projection display. For example, the phosphor on the wheel 112 may be a yellow phosphor such as a YAG:Ce phosphor. Since the yellow phosphor's emission light contains both green and red components, a green color and a red color can be generated by placing color filters downstream of the phosphor. A second light source 116 is provided, which may be blue LDs or LEDs. The phosphor's emission light from the wheel 112 and the blue light from the second light source 116 are combined by a combining device (e.g. dichroic filter) 114 to generate a white light, which has all three primary color components (red, green and blue) needed for projection display. This white light is directed by a lens 115 to a color wheel 204. The color wheel 204 has several filter segments that filters the white light into primary color lights. Therefore, the SSL source system, formed by the first SSL source 111, the phosphor wheel 112, optics (e.g. lens) 113, the light combining device (e.g. dichroic filter) 114, optics (e.g. lens) 115 and the second SSL source 116 shown in FIG. 2, can replace the UHP lamp 201 in FIG. 1, while other components of the system shown in FIG. 2, including the color wheel 204 and optical components downstream of it, can remain unchanged.

FIG. 3 shows the schematic structure of a color wheel 204 used in the system shown in FIGS. 1 and 2. In this example, the color wheel 204 includes three color filter segments which transmit red, green and blue light, respectively, and block other lights. When the color wheel 204 is driven by a drive mechanism to rotate, the color filter segments are sequentially moved into the light path of the optics 203/115 and illuminated by the white light, and red, green and blue lights passes through the color wheel sequentially. Referring to FIG. 5A as an example, the output light from the color wheel 204 has a repeating sequence shown over two periods of the color wheel's rotation.

SUMMARY OF THE INVENTION

In the light source system shown in FIG. 2, the two independent light sources 111 and 116 can both be driven in constant current mode, resulting in constant white light output from the system. However, such a constant white light source has a problem of low efficiency in color light generation. For example, when the blue filter segment of the color wheel 204 is moved to the path of the white light from lens 115, the yellow light generated by the phosphor wheel 112 will not be able to pass through the color wheel 204 and is therefore wasted. Similarly, when the green or red filter segment of the color wheel is moved to the path of the white light from lens 115, the blue light generated by the second light source 116 will not be able to pass through the color filter 204 and is therefore wasted. Therefore, significant amount of energy is wasted.

Accordingly, the present invention is directed to a method and apparatus for controlling SSL sources used in a projector system that substantially obviates one or more of the problems due to limitations and disadvantages of the related art.

An object of the present invention is to provide a more energy efficient light source module for projector systems.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a solid state light source module, which includes: at least two solid state light sources for generating at least two corresponding lights of different colors, each light containing at least one primary color component; a light combining device for combining the at least two lights into a combined light containing at least two primary color components; an output device for alternatingly outputting the at least two primary color components of the combined light to generate an output light having a predefined color sequence which repeats every period; a sync signal generator coupled to the output device for generating a periodic sync signal; and a controller coupled to sync signal generator and to each of the at least two solid state light sources, for supplying a drive signal to each of the at least two solid state light sources based on the sync signal, wherein during at least one sub-period of the period, one of the at least two solid state light sources is turned on by its drive signal and another one of the at least two solid state light sources is kept in an inactive state by its drive signal.

In another aspect, the present invention provides a solid state light source module which includes: a first solid state light sources for generating a first lights containing a first and a second primary color component; a first color wheel disposed to receive the first light, the first color wheel including a first segment and a second segment; a first drive mechanism for driving the first color wheel to rotate, wherein the first segment and the second segment are alternatingly disposed on a path of the first light, wherein the first and second segments of the first color wheel filter the converted light to generate filtered light containing a sequence of first primary color component and second primary color component; a second solid state light source for generating a second light containing a third primary color component; a light combining device for combining the filtered light from the first color wheel and the second light into a combined light; a sync signal generator coupled to the first color wheel for generating a periodic sync signal; and a controller coupled to the sync signal generator and to the first and second solid state light sources, for supplying a drive signal to each of the first and second solid state light sources based on the sync signal, wherein during at least one sub-period of each rotation of the first color wheel, one of the first and second solid state light sources is turned on by its drive signal and the other one of the first and second solid state light sources is kept in an inactive state by its drive signal.

In another aspect, the present invention provides a method for controlling a light source module for a projector device, which includes: (a) generating at least two primary color lights of different colors using at least two solid state light sources and combining them into one combined light containing at least two primary color components, and alternatingly outputting the at least two primary color components; (b) generating a periodic sync signal using a sync signal detector; and (c) using a controller to controls the drive power of the at least two solid state light sources based on the sync signal, so that during at least some sub-periods within each period of the periodic sync signal, at least one solid state light source is turned on and at least one slid state light source is inactive.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
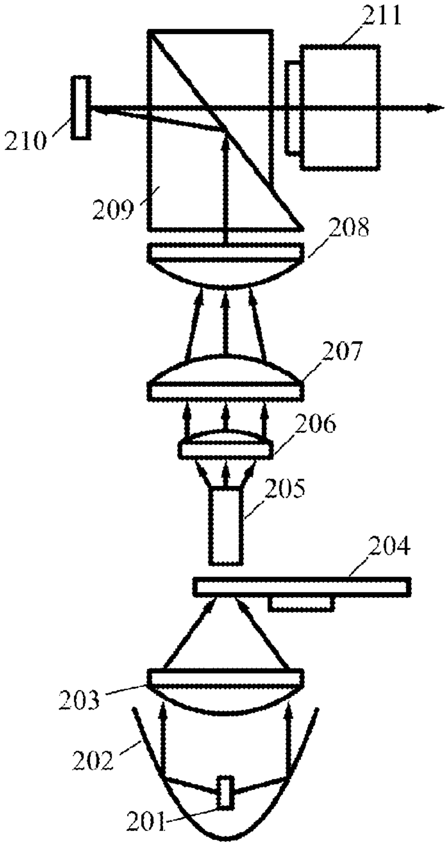
Fig. 1 (Prior Art)
FIG. 1 is a schematic diagram of a conventional single DLP projection system using a UHP lamp.

For simplicity, a projection display system is used as an example to illustrate the present invention. However, the power control methods and apparatus for solid state light sources described here apply to many other systems that require high luminance and light having a predefined color sequence.

Embodiments of the present invention provide a drive current control method and apparatus for controlling a solid state light source system or module used in a single-DLP projector. Such solid state light source module includes two or more light sources whose drive power can be independently controlled. The first solid state light source generates a first light having a wide spectrum that contains two or more primary color components needed for the projection display. For example, the primary colors needed in a projection display may be one or more of red, yellow, green, cyan, and blue. The first light source employs a yellow phosphor, the emission light of which has a spectrum that contains red, yellow, green, and even cyan components. The second light source (or multiple additional light sources collectively referred to as a second light source) generates a second light containing an additional one of the primary colors needed for the projection display. The second light is combined with the first light from the first light source by a color combiner such as a dichroic filter. The combined light is filtered by a color wheel having multiple filter segments, to generate an output light having a predefined color sequence which repeats every period. More than two sources may be used in this invention, where at least one of them has a wide spectrum that contains two primary color lights.

In alternative embodiment, the second light source directly generates the additional primary color light without a color filter, and the first and second lights are combined after the first light passes through the color filter.

The capability of being able to be easily modulated is an advantage of SSL sources compared with conventional gas discharge lamps. According to embodiments of the present invention, the first and second light sources are independently controlled and their drive currents are modulated according to synchronization signals derived from the color wheel. When only the color components generated by the first light source is needed in the output light, other light sources can be turned off. When the color components generated by the first light source is not needed, the first light source can be turned off. Therefore the first and second light sources can be turned off or put in standby state periodically, saving some amount of energy. On the other hand, since the first and second light sources can be turned off of put in standby state some of the time, the light sources can be driven to work under higher power when they are not turned off or in standby state, resulting in higher system brightness overall.

Emission light generated by wavelength conversion materials, for example, yellow phosphors, often has a wide spectrum that contains multiple color components, e.g. both green and red components. The first light source described above may include wavelength conversion materials excited by a blue/UV excitation source, such as a phosphor converted yellow LED which use phosphor deposited on the LED die directly or a remote yellow phosphor excited by a blue/UV excitation source. The first light from the first light source and the second light from the second light source can be combined together by a color combiner, when the spectra of the first light and second light do not overlap significantly. If the spectra of the first and second light have a large overlap, the total flux loss caused by the color combiner may be significant, e.g., larger than 40%, which is undesirable.

Figure 2:
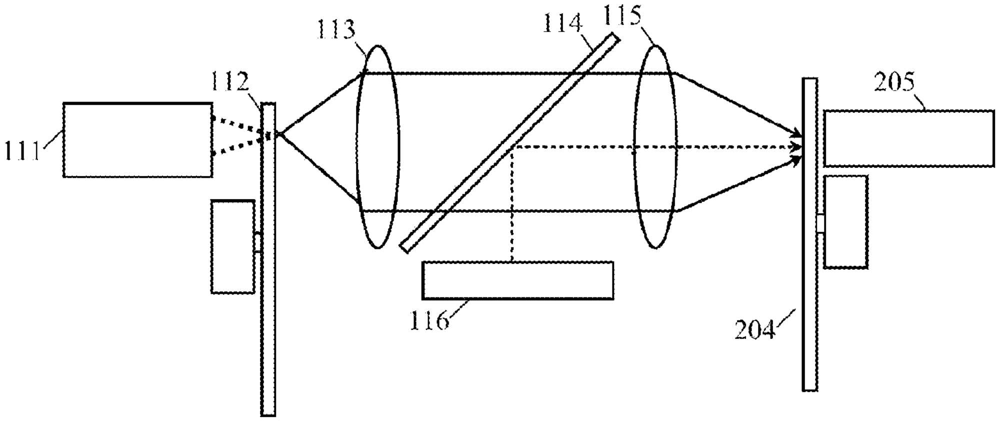
Fig. 2 (Prior Art)
FIG. 2 is a schematic diagram of a solid state light source module that can replace the UHP lamp in a single DLP projection system.

In the above described light source module, the first light source together with the second light source provide all primary colors needed for display purposes, such as red, green and blue primary colors. For instance, in one embodiment of the present invention, the first light source utilizes the emission from a yellow phosphor, such as a phosphor converted yellow LED. The second light source is a blue LED. The first light source and the second light source together will provide the red, green and blue colors. In another embodiment, three light sources are provided: the first light source utilizes the emission from a green phosphor, which contains cyan and green color components; the second source is a blue LD; and the third source is a red LD. The three light sources will provide four primary colors: red, cyan, green, and blue. In a third embodiment, the white light source shown in FIG. 2 is used as the light source module. In this embodiment, the first light source is the phosphor wheel 112 excited by the UV/blue source 111. The phosphor wheel 112 is driven by a drive mechanism to rotate. As different parts of the phosphor wheel 112 are illuminated at different times, overheating of the phosphor material is reduced. The second light source is the blue light source 116. When the second light source can directly provide a colored light without a color filter, then color combining can occur after the first light passes through the color filter of the first light source (described in more detail later). The white light source shown in FIG. 2 will be used as an example to further illustrate the principle of drive power modulation according to the present invention, but it should be understood that the drive current modulation described here can be applied to other light sources.

Figure 3:
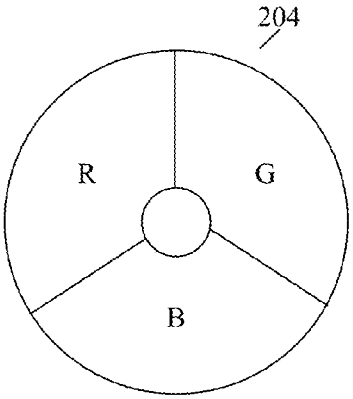
Fig. 3 (Prior Art)
FIG. 3 schematically illustrates a color wheel 204 used in the system shown in FIG. 1 and FIG. 2.
Figure 4:
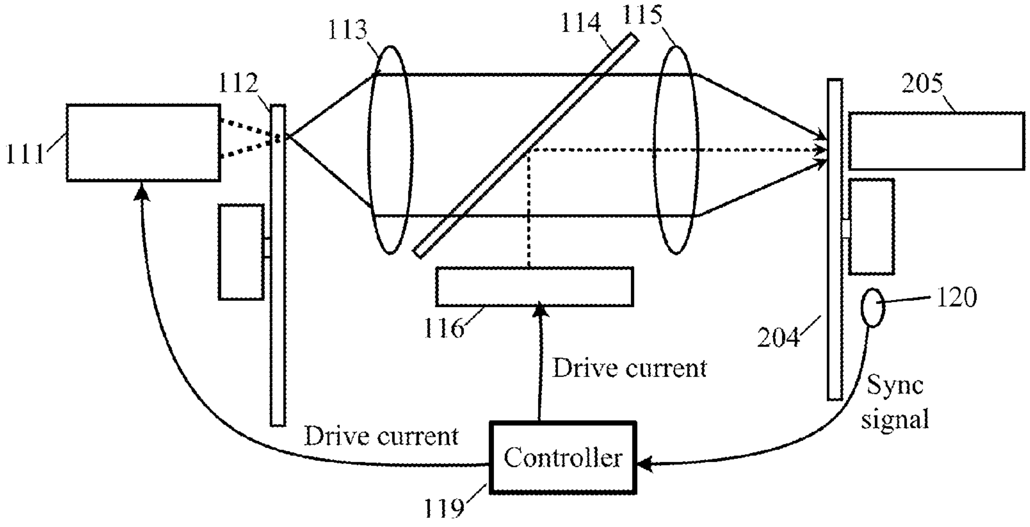
FIG. 4 schematically illustrates a solid state light source module according to an embodiment of the present invention which can be used in the projection system shown in FIG. 1.
Figure 5A:
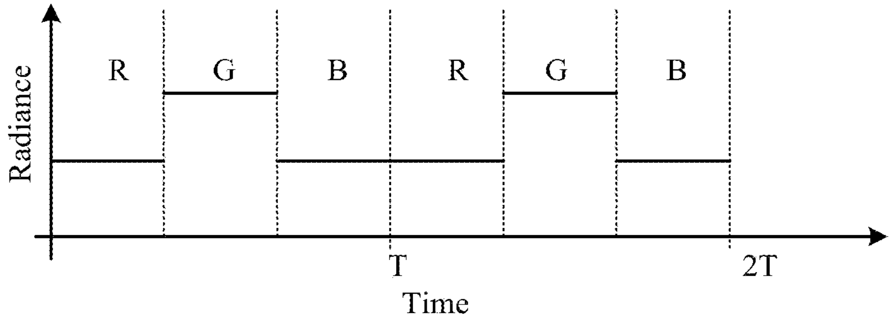
FIG. 5A shows an example of the output light sequence from the color wheel shown in FIG. 3.
Figure 5B:
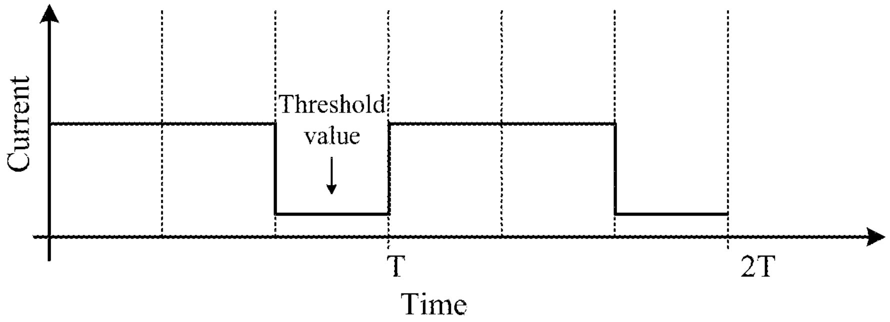
FIGS. 5B and 5C show modulated drive currents for the solid state light source module of FIG. 4 according to an embodiment of the present invention.
Figure 5C:
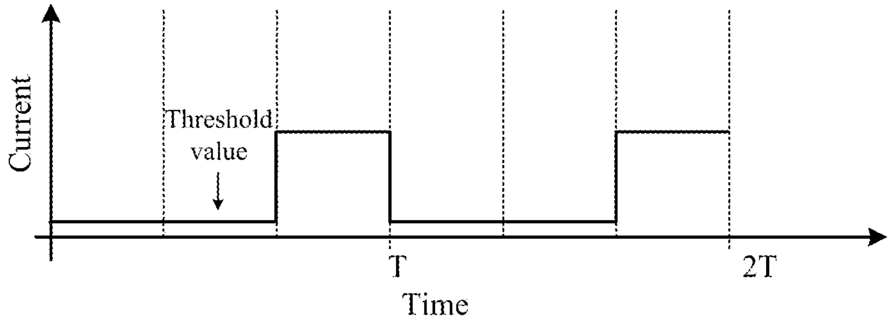

FIG. 4 schematically illustrates a light source module according to an embodiment of the present invention. This light source module is based on the system shown in FIG. 2 and like components are labeled with like symbols. Because the two SSL sources 111 and 116 do not have to be on simultaneously all the time, the controller 119 provides different modulated drive currents to the two SSL sources respectively, synchronized with the rotation of the color wheel 204. A sync signal detector 120 is coupled to the color wheel 204 to generate a synchronization signal. Taking the color wheel 204 shown in FIG. 3 as an example, the corresponding synchronized current signals generated by the controller 119 to drive the SSL sources 111 and 116 are shown in FIG. 5B and FIG. 5C respectively. The SSL source 111 is used to generate a yellow light including both red and green colors; thus, the drive current supplied to it is at a high current level when the red and green filter segments of the color wheel 204 are rotated into the illumination light path, and at a low current level during other times. Similarly, the drive current supplied to the blue source 116 is at a high current level when the blue filter segment of the color wheel 204 is rotated into the illumination light path, and at a low level during other times. The respective high current levels supplied to the SSL sources 111 and 116 cause these light sources to turn on and output a desired light level. The respective low current levels (referred to as the threshold value in FIGS. 5B and 5C) supplied to the SSL sources 111 and 116 are either zero or sufficiently low levels such that the SSL sources are kept in a warm-up (standby) state. In the warm-up state, the SSL sources do not generate appreciable light but are warm and can be quickly turned on. The off state and the standby state are collectively referred to as inactive state in this disclosure.

The synchronization signal for synchronizing the modulated drive current with the rotation of the color wheel 204 is provided by the sync signal generator 120 which detects a position of the color wheel 204. The detection may be done by optical, mechanical, electrical, or by other suitable means. The sync signal, which represents a timing of the repeating color sequence of the light from the color wheel, may have various forms and the synchronization control method of the controller 119 can be designed accordingly. For example, the sync signal may be in the form of one signal per revolution of the color wheel (one period) to indicate the start of the red color light, and the controller divides the period between two sync signals into three equal sub-periods for the R, G and B lights. Alternatively, the sync signal may indicate the start of each color light (e.g. three signals per period).

Driving the SSL sources using modulated drive current as described above has a number of benefits including energy saving and reduced heat generation. Additionally, due to reduced heat generation, the SSL sources can be driven at a higher current during the on time, resulting in a higher luminance output. For example, if LEDs are used in the blue source 116, the brightness can be boosted to be much higher in the modulated mode. On the other hand, if the luminance output is kept the same, the number of LDs or LEDs used in source 111 and 116 can be reduced, therefore reducing the system cost.

Figure 6:
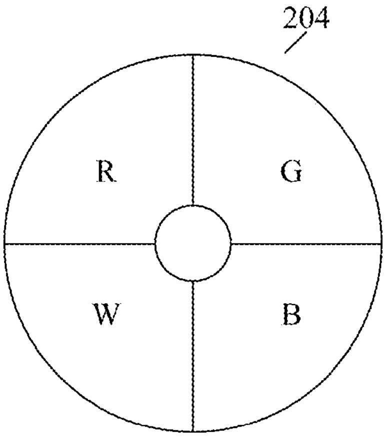
FIG. 6 shows another color wheel having red, green, blue and white segments useful in embodiments of the present invention.
Figure 7A:
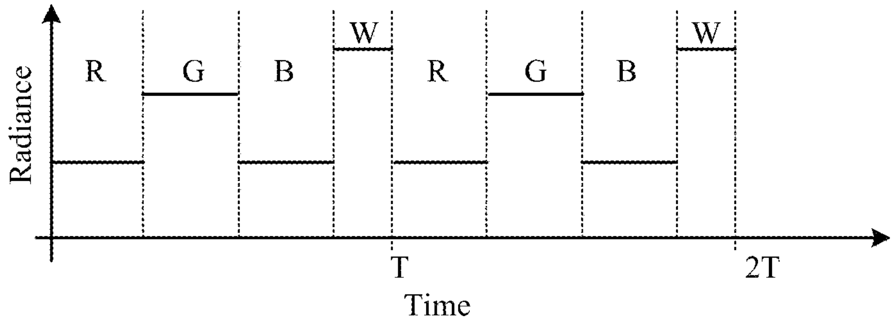
FIG. 7A shows an example of the output light sequence from the color wheel shown in FIG. 6.
Figure 7B:
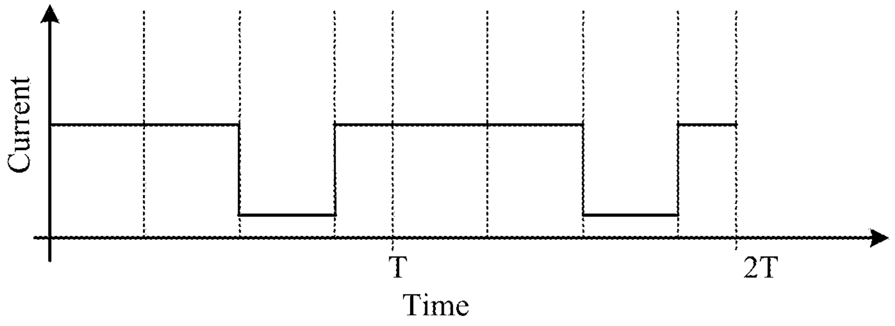
FIGS. 7B and 7C show modulated drive currents for the solid state light source module of FIG. 4 when the color wheel of FIG. 6 is used.
Figure 7C:
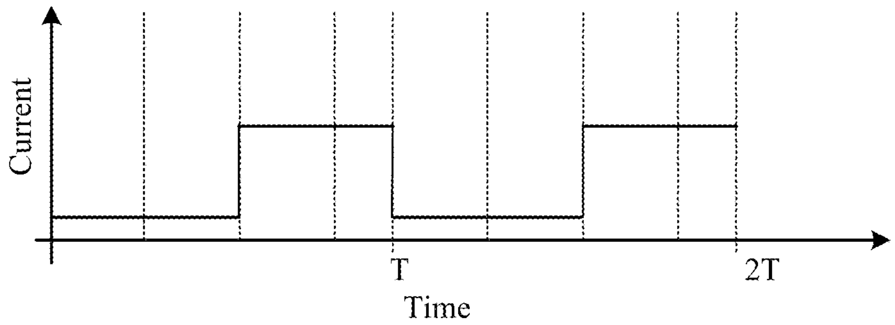

While the present invention has been described in regards to a three segment color wheel 204 shown in FIG. 3, it will also be understood that the color wheel 204 having different structures may also be used. For example, FIG. 6 shows a four-segment color wheel often used in commercial DLP projectors. In addition to filter segments for the red, green and red primary colors, the color wheel has a white segment (W) which is a clear segment with no color filters, resulting in a sub-period during which the white light passes through the color wheel. The white light boosts image brightness at the cost of reduced saturation. If the four-segment wheel is used in the system shown in FIG. 4, the output light sequence from the color wheel, the synchronized drive currents for SSL source 111 and SSL source 116 are as shown in FIG. 7A-7C, respectively. In this case, the SSL source 111 and 116 are both turned on when the white segment of the color wheel is in the illumination path, increasing the duty cycle of the drive current, thus making the SSL sources more fully utilized.

Another feature in this example is that the system can switch from the RGBW mode with white boost to the RGB mode without white boost by providing zero or low drive currents for both SSL sources 111 and 116 when the white segment of the color wheel 204 is rotated into the illumination path, without additional energy loss compared with the conventional projector using UHP lamps.

Some projection systems have both a RGB color wheel and a RGBW color wheels and can switch from one to the other. It should be understood that the drive current modulation method described above can be applied to such systems by providing two corresponding control modes.

Although in the exemplary diagram shown in FIGS. 5B-C and FIGS. 7B-C, the drive current values are constant when a source is turned on (e.g., in FIG. 5B, the drive current for the SSL source 111 is the same for the R and G sub-periods), it should be understood that its current can also be different when different segments of the color wheel is on the illumination path. For example, when the first source 111 illuminates a YAG:Ce phosphor wheel 112, and the color wheel 204 has three segments as shown in FIG. 3, the source 111 is turned on when the green filter segment and red filter segment of the color wheel 204 are illuminated. Since the red component is weaker than the green component in the emission spectrum of YAG:Ce yellow phosphors, the drive current for the source 111 may be made higher when the red filter segment of the color wheel is in the illumination light path than when the green filter segment is in the illumination path. This improves the relative strength of the red and green color light outputted by the light source module. In other embodiments, the drive currents for different output color can be adjusted as well, thus such system can provide different luminance or radiance ratios between the output primary colors, which may be desirable for different color modes.

Figure 8:
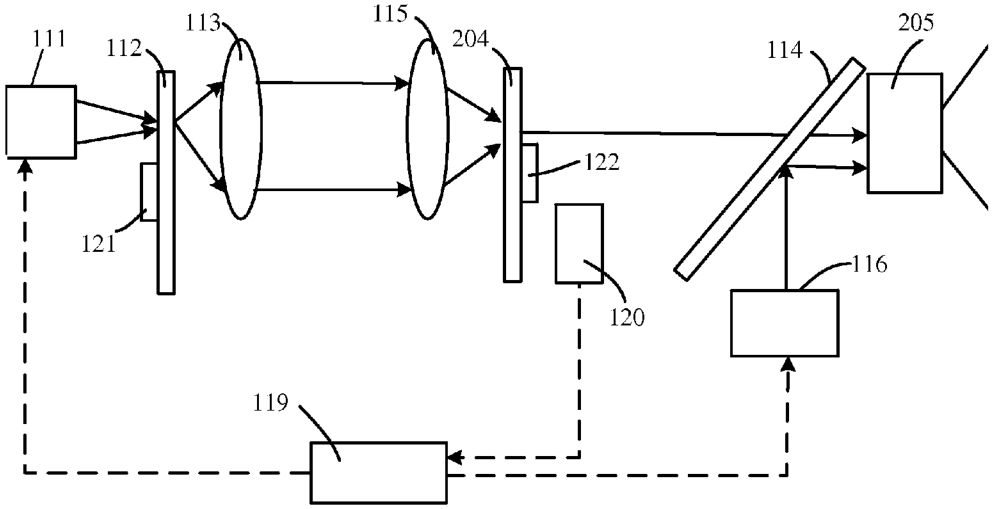
FIG. 8 schematically illustrates a solid state light source module according to another embodiment of the present invention which can be used in the projection system shown in FIG. 1.

FIG. 8 illustrates a light source module according to another embodiment of the present invention. Parts of this light source module are similar to that shown in FIG. 4 and like components are labeled with like symbols. The drive mechanism 121 and 122 for the phosphor wheel 112 and the color wheel 204, respectively, are also labeled. A difference between the light source module of FIG. 8 and that of FIG. 4 is that in FIG. 8, the second light source 116 and the light combining device 114 are located downstream from the color wheel 204. The primary color light generated by the color wheel 204 (a part of the first light source) is combined with the primary color light generated by the second light source 116 by the light combining device 114, which may be a dichroic filter. The color wheel 204 may have three segments as shown in FIG. 4, or four segments as shown in FIG. 6. In the embodiment where the phosphor wheel 112 generates a yellow light, the color wheel 204 has a red filter segment and a green filter segment, and the nature of the third segment (corresponding to blue sub-period in the output light) of the color wheel 204 is unimportant since the light source 116 is inactive during that sub-period. It may be a blue filter, a clear segment, or a non-transparent segment.

When the red and green filter segments of the color wheel 204 is in the illumination path, respectively, the controller 119 supplies high drive currents (either the same or different for the R and G subOperiods) to the first SSL source 111, and supplies a low drive current to the second SSL source 116. When the third segment of the color wheel 204 is in the illumination path, the controller 119 supplies a low drive current to the first SSL source 111, and supplies a high drive current to the second SSL source 116. Again, the low drive currents are either zero or sufficiently low currents to keep the respective SSL sources in a warm-up state without generating appreciable light.

The light source module shown in FIG. 8 has similar advantages as the light source module shown in FIG. 4. In addition to projector system shown in FIG. 1, the light source modules shown in FIGS. 4 and 8 can be used in other systems that require an alternating sequence of color light.

To summarize, in the drive currents control method described above, the controller 119 controls the drive current of two or more SSL sources based on a sync signal detected from the movement of the color wheel 204. During at least some of the sub-periods within each revolution of the color wheel, at least one SSL source is turned on and at least one SSL source is in an inactive state, which saves energy. The inactive state is one in this the SSL source does not generate appreciable light and is in a warm-up state which enables it to be quickly turned on.

Figure 9:
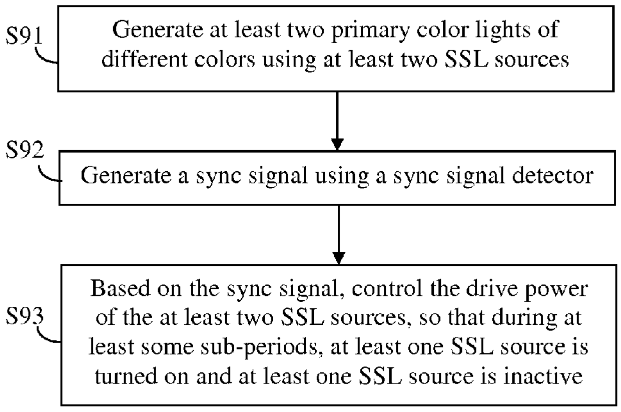
FIG. 9 schematically illustrates a drive power control method for a solid state light source module according to an embodiment of the present invention.

FIG. 9 summarizes a drive currents control method according to embodiments of the present invention. In step S91, at least two primary color lights of different colors are generated using at least two SSL sources, either directly or indirectly (e.g. via a phosphor material). The various SSL source described above may be used to perform this step. In step S92, a periodic sync signal is generated using a sync signal detector. The sync signal may be generated by detecting motion of the color wheel that is used to generate at least one of the primary color light as described earlier. In step S93, the controller controls the drive power of the at least two SSL sources, so that during at least some sub-periods within each period of the periodic sync signal, at least one SSL source is turned on and at least one SSL source is inactive. The control may be achieved by changing the current or voltage of the drive signal supplied to the SSL sources, or if the drive signal is a pulse-width modulated (PWM) signal, changing the pulse width (duty cycle) of the drive signal.

Using the above method, the light source module can output the sequence of color light required by the projector, while saving energy by making some SSL sources inactive during some sub-periods.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A solid state light source module comprising:

at least two solid state light sources for generating at least two corresponding lights of different colors, each light containing at least one primary color component;

a light combining device for combining the at least two lights into a combined light containing at least two primary color components;

an output device for alternatingly outputting the at least two primary color components of the combined light to generate an output light having a predefined color sequence which repeats every period;

a sync signal generator coupled to the output device for generating a periodic sync signal; and a controller coupled to the sync signal generator and to each of the at least two solid state light sources, for supplying a drive signal to each of the at least two solid state light sources based on the sync signal, wherein during at least one sub-period of the period, one of the at least two solid state light sources is turned on by its drive signal and another one of the at least two solid state light sources is kept in an inactive state by its drive signal.

2. The solid state light source module of claim 1, wherein a first one of the at least two solid state light source includes:

a solid state excitation light source generating an excitation light; and a wavelength conversion device for converting the excitation light to a converted light;

wherein the output device includes a first color wheel disposed to receive the converted light, the first color wheel including a first segment and a second segment;

wherein the solid state light source module further comprises a first drive mechanism for driving the first color wheel to rotate, wherein the first segment and the second segment are alternatingly disposed on a path of the converted light, wherein the first and second segments of the first color wheel filter the converted light to generate a first primary color light and a second primary color light.

3. The solid state light source module of claim 2, wherein the wavelength conversion device comprises:

a second wheel carrying a wavelength conversion material; and a second drive mechanism to drive the second wheel to rotate, wherein the excitation light illuminates the wavelength conversion material on the second wheel along a predetermined path.

4. The solid state light source module of claim 2, wherein a second one of the at least two solid state light source generates a third primary color light, wherein the light combination device combines the converted light and the third primary color light into the combined light to illuminate the first color wheel, wherein the first color wheel further includes a third segment, wherein the first, second and third segments are alternatingly disposed on a path of the combined light when the first color wheel rotates, and wherein the third segment filters the combined light to generate a third primary color light.

5. The solid state light source module of claim 4, wherein the sync signal generator is coupled to the first color wheel to generate the periodic sync signal.

6. The solid state light source module of claim 4, wherein the controller supplies a first power to the first solid state light source when the first segment is in the path of the converted light, supplies a second power to the first solid state light source when the second segment is in the path of the converted light, and supplies a low power to the first solid state light source when the third segment is in the path of the converted light, the low power being lower than the first and second power.

7. The solid state light source module of claim 6, wherein the low power turns off the first solid state light source or keeps it in a standby state.

8. The solid state light source module of claim 4, wherein the controller supplies a third power to the second solid state light source when the third segment is in the path of the converted light, and supplies a low power to the second solid state light source when the first and second segments are in the path of the converted light, the low power being lower than the third power.

9. The solid state light source module of claim 8, wherein the low power turns off the second solid state light source or keeps it in a standby state.

10. The solid state light source module of claim 4, wherein the first color wheel further includes a fourth segment which transmits the converted light and the third primary light, wherein the first through fourth segments are alternatingly in the path of the converted light and the third primary color light, and wherein when the fourth segment is in the path of the converted light and the third primary color light, the controller controls the first and second solid state light sources to turn on.

11. A solid state light source module comprising:

a first solid state light source for generating a first lights containing a first and a second primary color component;

a first color wheel disposed to receive the first light, the first color wheel including a first segment and a second segment;

a first drive mechanism for driving the first color wheel to rotate, wherein the first segment and the second segment are alternatingly disposed on a path of the first light, wherein the first and second segments of the first color wheel filter the converted light to generate filtered light containing a sequence of first primary color component and second primary color component;

a second solid state light source for generating a second light containing a third primary color component;

a light combining device for combining the filtered light from the first color wheel and the second light into a combined light;

a sync signal generator coupled to the first color wheel for generating a periodic sync signal; and a controller coupled to the sync signal generator and to the first and second solid state light sources, for supplying a drive signal to each of the first and second solid state light sources based on the sync signal, wherein during at least one sub-period of each rotation of the first color wheel, one of the first and second solid state light sources is turned on by its drive signal and the other one of the first and second solid state light sources is kept in an inactive state by its drive signal.

12. The solid state light source module of claim 11, wherein the first solid state light source comprises:

a solid state excitation light source generating an excitation light;

a second wheel carrying a wavelength conversion material, disposed to receive the excitation light, the wavelength conversion material converting the excitation light into a converted light; and a second drive mechanism to drive the second wheel to rotate, wherein the excitation light illuminates the wavelength conversion material on the second wheel along a predetermined path.

13. A method for controlling a light source module for a projector device, comprising:

(a) generating at least two primary color lights of different colors using at least two solid state light sources and combining them into one combined light containing at least two primary color components, and alternatingly outputting the at least two primary color components;

(b) generating a periodic sync signal using a sync signal detector; and (c) using a controller to control the drive power of the at least two solid state light sources based on the sync signal, so that during at least some sub-periods within each period of the periodic sync signal, at least one solid state light source is turned on and at least one solid state light source is inactive.

14. The method of claim 13, wherein step (a) includes:

using one of the at least two solid state light sources to generate an excitation light;

using a wavelength conversion device to convert the excitation light into a converted light;

using a first drive mechanism to drive a first color wheel to rotate, the color wheel having a first and a second segment, the first and second segment alternatingly disposed in a path of the converted light when the first color wheel rotates, and wherein the first and second segments of the color wheel filter the converted light to generate a first primary color light and a second primary color light.

15. The method of claim 14, wherein step (a) further includes:

using a second one of the at least two solid state light source to generate a third primary color light; and using a light combination device to combine the converted light and the third primary color light into the combined light to illuminate the first color wheel, wherein the first color wheel further includes a third segment, wherein the first, second and third segments are alternatingly disposed on a path of the combined light when the first color wheel rotates, and wherein the third segment filters the combined light to generate a third primary color light.

16. The method of claim 14, wherein step (a) further includes:

using a second one of the at least two solid state light source to generate a third primary color light;

using a light combination device to combine the first and second primary color lights and the third primary color light into the combined light to illuminate the first color wheel, wherein the first color wheel further includes a third segment, wherein the first, second and third segments are alternatingly disposed on a path of the combined light when the first color wheel rotates, and wherein the third segment filters the combined light to generate a third primary color light.

17. The method of claim 15, wherein step (c) includes:

using controller to supply a first power to the first solid state light source when the first segment is in the path of the converted light, to supply a second power to the first solid state light source when the second segment is in the path of the converted light, to supply a low power to the first solid state light source when the third segment is in the path of the converted light, the low power being lower than the first and second power, to supply a third power to the second solid state light source when the third segment is in the path of the converted light, and to supply another low power to the second solid state light source when the first and second segments are in the path of the converted light, the other low power being lower than the third power.

* * * * *